No. 732,602. PATENTED JUNE 30, 1903.
P. SWAN.
ELECTRIC MOTOR FOR CEILING FANS.
APPLICATION FILED JAN. 13, 1903.
NO MODEL.
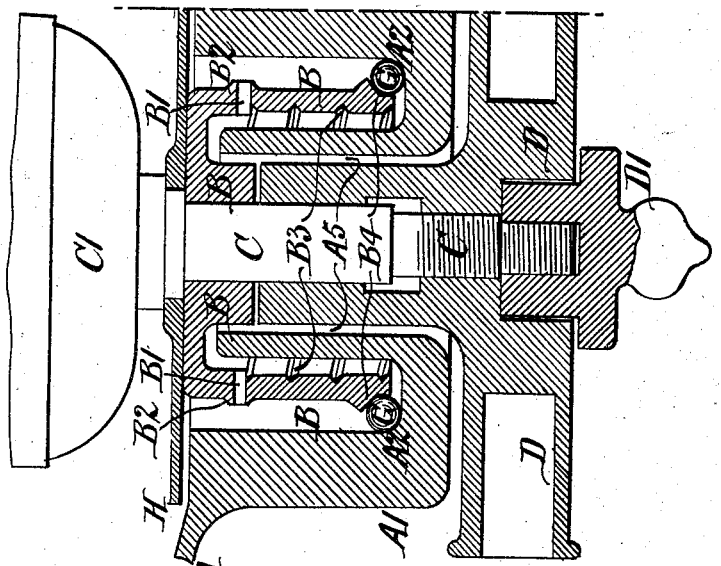
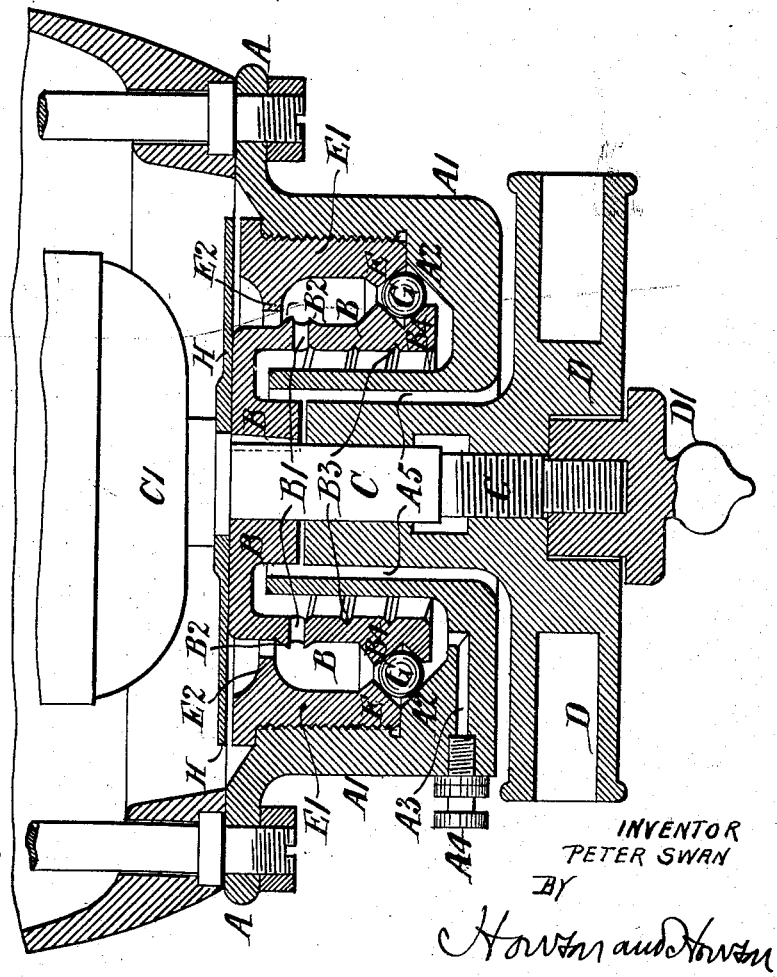
WITNESSES:
F. W. Wright.
Walter Abbe
INVENTOR
PETER SWAN
BY
Howson and Howson
HIS ATTORNEYS.

No. 732,602. Patented June 30, 1903.

UNITED STATES PATENT OFFICE.

PETER SWAN, OF CALCUTTA, INDIA.

ELECTRIC MOTOR FOR CEILING-FANS.

SPECIFICATION forming part of Letters Patent No. 732,602, dated June 30, 1903.

Application filed January 13, 1903. Serial No. 138,866. (No model.)

*To all whom it may concern:*

Be it known that I, PETER SWAN, a subject of the King of Great Britain and Ireland, Emperor of India, and a resident of Calcutta, India, (whose postal address is 52 and 53 Park street, Calcutta, India,) have invented certain new and useful Improvements in Electric Motors for Ceiling-Fans, (for which I have applied for British Patent, No. 16,072, dated July 19, 1902,) of which the following is a specification.

My said invention relates to electric motors for ceiling-fans, which motors have their armature-spindles revolving upon a vertical axis; and it has for its object to improve the arrangement and construction of such spindles, so as thereby to render the motors more efficient and reliable. These electric motors have hitherto been generally made with an upper and a lower bearing, the upper bearing having an oil-cup attached to the armature-spindle revolving in the said bearings. It is found in practice, however, that this arrangement is defective, as oil constantly finds its way down the spindle from the upper bearing onto the commutator or onto the armature-coils, where it corrodes the insulation and causes short-circuiting.

My invention is designed to overcome such defect; and it consists in dispensing with the upper bearing and oil-cup and employing only a lower ball-bearing of improved construction, so that the armature will run true and neither vibrate nor tilt, while at the same time ample provision is made for the efficient and continuous lubrication of the said bearing.

The invention is represented in the accompanying drawings, in which the same reference-letters are used to mark the same or like parts wherever they are repeated.

Figures 1 and 2 are vertical sections of slightly different examples of my improved bearing as applied to electric motors having vertically-mounted drum-armatures.

According to the invention as shown in Fig. 1, the lower cover part A of the motor is formed with an oil-containing annular trough A', having a conical bearing part $A^2$ arranged at its lower end, an outlet $A^3$, provided with a screwed stopper $A^4$, being furnished on the trough for the purpose of draining it when necessary. An inverted cup-piece B is fixed to the armature-spindle C immediately below the armature C', the spindle passing down through a comparatively large central opening $A^5$, formed in the trough, the usual holder D for the fan-blades being screwed to the spindle and also additionally fixed by means of a jam or locking nut D'. The inverted cap B extends down into the annular trough A' to within a short distance of the bottom, its diameter being such that annular spaces are left both on its inner and outer sides. Lateral openings B', having outer projecting edges $B^2$, are formed in the cup B near its top end, the internal diameter of the cup at the top being slightly larger than what it is at the mouth or bottom end. A screw-thread or spiral groove $B^3$, of coarse pitch, is cut on the inside of the cup B, being made to extend from the bottom edge to the lateral openings B'. Conical or V-shaped bearing parts $B^4$ are formed on the lower end of the cup B, the lower one of these bearing parts corresponding with the similar bearing part $A^2$ on the trough A', while the upper one corresponds with a conical bearing E, formed on a gland E', screwed into the trough. Two opposite sets of V-shaped bearings or races are thus formed, and balls G, of steel or other suitable metal, are interposed between the parts, so as to make up the ball-bearing as required, the bearing being adjusted by means of the screwed gland E'. An internal rim or flange $E^2$ is formed on the screwed gland E', so as to be immediately over the lateral openings B' in the cup B when the gland is screwed down into place, and a vulcanized fiber washer H is fitted over the top of the cup B and trough A', so as to act as a protecting-cover. When the motor is running, the lubricating-oil in the trough A' travels up the screw $B^3$, cut in the inside of the cup B, and then returns back again to the trough through the top lateral openings B'. By thus circulating the oil up and down a most effective lubrication of the ball-bearing is thereby provided. The oil as it escapes from the cup B at the top is thrown clear of the lateral openings B', being prevented from rising and overflowing by the projecting edges $B^2$, around the lateral opening and the rim or flange $E^2$, arranged above them on the screwed gland E'. If desired, the improved lower bearing as hereinbefore described, may be furnished with more than one set of ball-races, which would then be arranged above each other.

Fig. 2 shows the same type of bearing in a simpler and cheaper form, the main difference being that the screwed adjusting-gland E' is dispensed with.

I claim as my invention—

1. In electric motors for ceiling-fans, having drum-armatures running on a vertical axis, an oil-containing trough encircling the armature-carrying part, an inverted cup in said trough, fixed conical ball-bearing parts therein, counterpart conical ball-bearing parts fixed to the armature-carrying part, balls interposed between the bearings, and a screw-threaded part arranged to encircle the armature-carrying part, substantially as and for the purpose described.

2. In an electric motor for ceiling-fans, having a drum-armature running on a vertical axis, a lower cover fitted below the armature, an oil-containing trough encircling the armature-carrying part, ball-bearing parts arranged on the cover, ball-bearing parts fixed to the armature-carrying part, balls interposed between the bearing parts, there being oil-ducts arranged to communicate with the oil-trough and the ball-bearings, and a screw-thread or spiral part arranged to encircle the armature-carrying part, substantially as described.

In testimony whereof I have signed my name to this specification in the presence of two subscribing witnesses.

PETER SWAN.

Witnesses:
   IOQESH CHANDER BOSE,
   JATISH CHANDER DASS.